(12) United States Patent
Cheng et al.

(10) Patent No.: US 7,758,780 B2
(45) Date of Patent: Jul. 20, 2010

(54) METHOD OF SENSING MELT-FRONT POSITION AND VELOCITY

(75) Inventors: Jungwei-John Cheng, Chia-Yi (TW); Yu-Wei Lin, Chia-Yi (TW); Tzu-Ching Chao, Chia-Yi (TW); Bo-Fong Huang, Chia-Yi (TW); Lih-Harng Chang, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 0 days.

(21) Appl. No.: 12/176,189

(22) Filed: Jul. 18, 2008

(65) Prior Publication Data

US 2009/0045537 A1 Feb. 19, 2009

(30) Foreign Application Priority Data

Aug. 17, 2007 (TW) ............... 96130529 A (51) Int. Cl.
 *B29C 45/76* (2006.01)
(52) U.S. Cl. ............ 264/40.1; 264/40.3; 264/40.5; 264/40.7; 425/145; 700/200; 700/203
(58) Field of Classification Search ........... 264/40.1, 264/40.3, 40.4, 40.5, 40.7; 425/145; 700/200, 700/203
See application file for complete search history.

(56) References Cited

U.S. PATENT DOCUMENTS

| | | | | | |
|---|---|---|---|---|---|
| 3,937,776 | A | * | 2/1976 | Hold et al. | 264/40.4 |
| 4,816,197 | A | * | 3/1989 | Nunn | 264/40.6 |
| 5,062,785 | A | * | 11/1991 | Stroud et al. | 425/145 |
| 5,102,587 | A | * | 4/1992 | Kumamura et al. | 264/40.1 |
| 5,377,119 | A | * | 12/1994 | Backer et al. | 700/146 |
| 5,442,544 | A | * | 8/1995 | Jelinek | 700/29 |
| 5,581,468 | A | * | 12/1996 | White et al. | 700/204 |
| 5,940,309 | A | * | 8/1999 | White et al. | 703/7 |
| 5,997,778 | A | * | 12/1999 | Bulgrin | 264/40.1 |
| 6,096,088 | A | * | 8/2000 | Yu et al. | 703/9 |
| 6,816,820 | B1 | * | 11/2004 | Friedl et al. | 703/2 |
| 6,854,967 | B2 | * | 2/2005 | Tsutsui et al. | 425/145 |
| 7,291,297 | B2 | * | 11/2007 | Weatherall et al. | 264/40.1 |
| 2002/0019674 | A1 | * | 2/2002 | Liang et al. | 700/49 |
| 2003/0062643 | A1 | * | 4/2003 | Bulgrin et al. | 264/40.1 |

(Continued)

OTHER PUBLICATIONS

Yarlagadda et al, A neural network system for the prediction of process parameters in pressure die casting, 1999, J. of Materials Processing Technology, 89-90, pp. 583-590.*

(Continued)

*Primary Examiner*—Joseph S Del Sole
*Assistant Examiner*—Timothy Kennedy
(74) *Attorney, Agent, or Firm*—Apex Juris, pllc; Tracy M Heims (57) ABSTRACT

A method of sensing melt-front position and velocity is applicable for injection-molding systems. Firstly, at least one actuation signal value of the melt-injection device of the injection-molding system is retrieved, and at least one state variable value of the injection-molding system is measured. Then, the retrieved actuation signal values and the measured state variable values are substituted into a plurality of simultaneous equations to calculate the melt-front position and velocity of the injection-molding system.

13 Claims, 9 Drawing Sheets

U.S. PATENT DOCUMENTS

| | | | | |
|---|---|---|---|---|
| 2003/0080452 | A1* | 5/2003 | Bulgrin et al. | 264/40.1 |
| 2004/0139810 | A1* | 7/2004 | Saito et al. | 73/865.9 |
| 2005/0092113 | A1* | 5/2005 | Saito et al. | 73/865.9 |
| 2005/0114104 | A1* | 5/2005 | Friedl et al. | 703/2 |
| 2006/0145379 | A1* | 7/2006 | Okazaki | 264/40.1 |
| 2006/0191347 | A1* | 8/2006 | Uchiyama et al. | 73/714 |
| 2007/0113691 | A1* | 5/2007 | Saito et al. | 73/865.9 |

OTHER PUBLICATIONS

Chen et al, An on-line measruement scheme of melt-front-area during injection filling via a soft-sensor implentation, Proceedings from SPE ANTEC 2000, 2000, pp. 633-636.*

Gao et al, Robust iterative learning control with applications to injection molding process, 2001, Chemical Engineering Science, 56, pp. 7025-7034.*

Yarlagadda et al, Development of hybrid neural network system for prediction of process parameters in injection moulding, 2001, 118, pp. 110-116.*

Yang et al, Setting of injection velocity profile via an iterative learning control approach, 2002, IFAC.*

Tan et al, Learning-enhanced PI control of ram velocity in injection molding machines, 2002, Engineering Applications of Artificial Intelligence, 15, pp. 65-72.*

Cheng et al, A model-based virtual sensing approach for the injection molding process, 2004, Polymer Engineering and Science, 44, 9, pp. 1605-1614.*

Chen et al, A soft-sensor development for melt-flow-length measurement during injection mold filling, 2004, Materials Science and Engineering A, 384, pp. 245-254.*

Yu-Wei Lin, J.-W. John Cheng, Model-Based Melt Flow Virtual Sensors for Filing Process of Injection Molding, Polymer Engineering and Science-2008, 2008, 543-555, Published online in Wiley InterScience, Taiwan, www.interscience,wiley.com.

* cited by examiner

Perform a injection operation by the melt injection device and provide a plurality of device control variables for injecting the melt s301

Retrieve values of an actuation signals and calcalate a plurality of predicted values according to the actuation signals and at least one state variable of the injection molding system s302

Input the measured value of at least one state variable of the injection molding system and its corresponding predicted value to an error-correction modification values to obtain more robust and accurate estimates of the state variables including the desired melt-front postion and velocity s303

METHOD OF SENSING MELT-FRONT POSITION AND VELOCITY

CROSS-REFERENCE TO RELATED APPLICATIONS

This non-provisional application claims priority under 35 U.S.C. §119(a) on Patent Application No(s). 096130529 filed in Taiwan, R.O.C. on Aug. 17, 2007 the entire contents of which are hereby incorporated by reference.

BACKGROUND OF THE INVENTION

1. Field of the Invention

The present invention relates to a method of sensing melt-front position and velocity, and more particularly to a sensing method capable of predicting state variables of a melt-injection device and further using the predicted values and actually measured values to perform an error correction so as to reliably calculate the melt-front position and velocity.

2. Related Art

Generally, the melt-front sensing mechanisms of a melt-injection device can be categorized into two classes: one being the hardware-based and the other the software-based. The hardware-based sensing approaches can be further divided into two types, the non-contact type and the contact one. One example of the non-contact sensing is the ultrasonic sensing, in which an ultrasonic probe is installed on the outer surface of the mold to emit detection waves and to receive the reflected wave so as to determine the state of the melt. The non-contact feature is the advantage of this approach, but the high cost of the sensing equipment prevents widespread installation of the non-contact sensors. An example of the contact sensing is the capacitive sensing, in which an electrode plate is adhered on the inner wall of the mold cavity, and the melt-front position and velocity are detected by measuring the capacitance variation when the melt flows over the electrode plate. Because of the high pressure and fast flow velocity inside the mold cavity, reliable installation of the sensing electrode becomes the major concern for the capacitive sensing. In fact, the possibly unreliable installation is a general concern with any contact sensing approach.

With the stated problems associated with existing hardware sensing methods, the software-based sensing approach, also called the virtual-sensing for not requiring any hardware sensor, constitutes a competitive alternative. By taking four signals as its inputs, including the displacement and velocity of an injection screw, the nozzle pressure, and the nozzle temperature, a recently proposed software sensing method outputs the melt-front position by employing an artificial neural network which predicts the values of the state variables of the melt-injection device at the next sampling time based on the current values of the state variables and the input signals. This software sensing approach belongs to the so-called open-loop prediction, where the output signal is predicted solely based on the input signals without any feedback correction of the prediction error. Lacking proper error feedback correction, accuracy of the melt front position predicted by the current software sensing method deteriorates when the input signals are interfered by external disturbances or when the melt injection situation is changed.

SUMMARY OF THE INVENTION

In view of the aforementioned problems, the present invention provides a novel virtual-sensing method for sensing melt-front position and velocity without additionally installing hardware measuring apparatus on the melt-injection device. Furthermore, the new method overcomes the deficiency of the current software sensing method whose sensing accuracy is easily affected by external disturbances and by changes in the melt injection situation.

The present invention provides a method of sensing melt-front position and velocity, which is applicable to a melt-injection device. The process of performing a melt injection operation by the melt-injection device is briefly described as follows. After a plurality of actuation signals is received, appropriate actuators are operated to result in the changes of the state variables of the melt-injection device, so as to achieve the injection of the melt as expected by the user.

In the present invention, at least one actuation signal of the melt-injection device is retrieved, and at least one state variable of the melt-injection device is measured. Then, the retrieved actuation signals and the measured state variables of the melt-injection device are substituted into a plurality of simultaneous equations to calculate, or in technical term, to estimate the melt-front position and velocity (For technical preciseness, in this document the words 'estimate' and 'predict' bear different meanings, referring respectively to calculation with and without an error-correction modification.). The plurality of simultaneous equations is designed on the basis of a melt-injection dynamic equation incorporating with an error-correction modification term. The operation of the present invention is that, once the retrieved actuation signals are input into the plurality of simultaneous equations, a prediction operation of the state variables of the melt-injection device and an error-correction modification to the predicted values are performed internally at the same time, so as to come up with estimated values of the state variables of the melt-injection device and then output the estimated melt-front position and velocity. As for the prediction operation, the retrieved actuation signals are input into the part designed based on the melt-injection dynamic equation in the plurality of simultaneous equations, and then, a plurality of predicted values of the state variables of the melt-injection device is internally calculated. The plurality of predicted state variables includes all the state variables of the melt-injection device. As for the error-correction modification, the measured and the predicted values of the retrieved state variables of the melt-injection device are used to calculate an error value, and through the error-correction modification term in the plurality of simultaneous equations, thereby an error-correction modification to the predicted values of the state variables is performed.

The reason for the present invention to achieve the functions and features that the prior arts cannot achieve lies in that the present invention is constructed on the basis of the dynamics of the melt-injection device and is developed according to the rigorous "observer theory" in the field of control systems engineering. By using as few as one easily-measurable state variable of the melt-injection device to calculate the melt-front position and velocity, the present invention solves the problem that the melt-front position and velocity are difficult to be measured by hardware sensors. Furthermore, the software sensing process in the present invention has a feature of closed-loop error-correction, so the estimated melt-front position and velocity are more accurate and reliable than the current software-based sensing approach when faced with external disturbances and changes in melt injection situation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In order to aid further understanding of the objective, constructional feature, and functioning of the present invention, a detailed description is given below through a relevant embodiment with reference to the accompanying drawings.

Figure 1A:
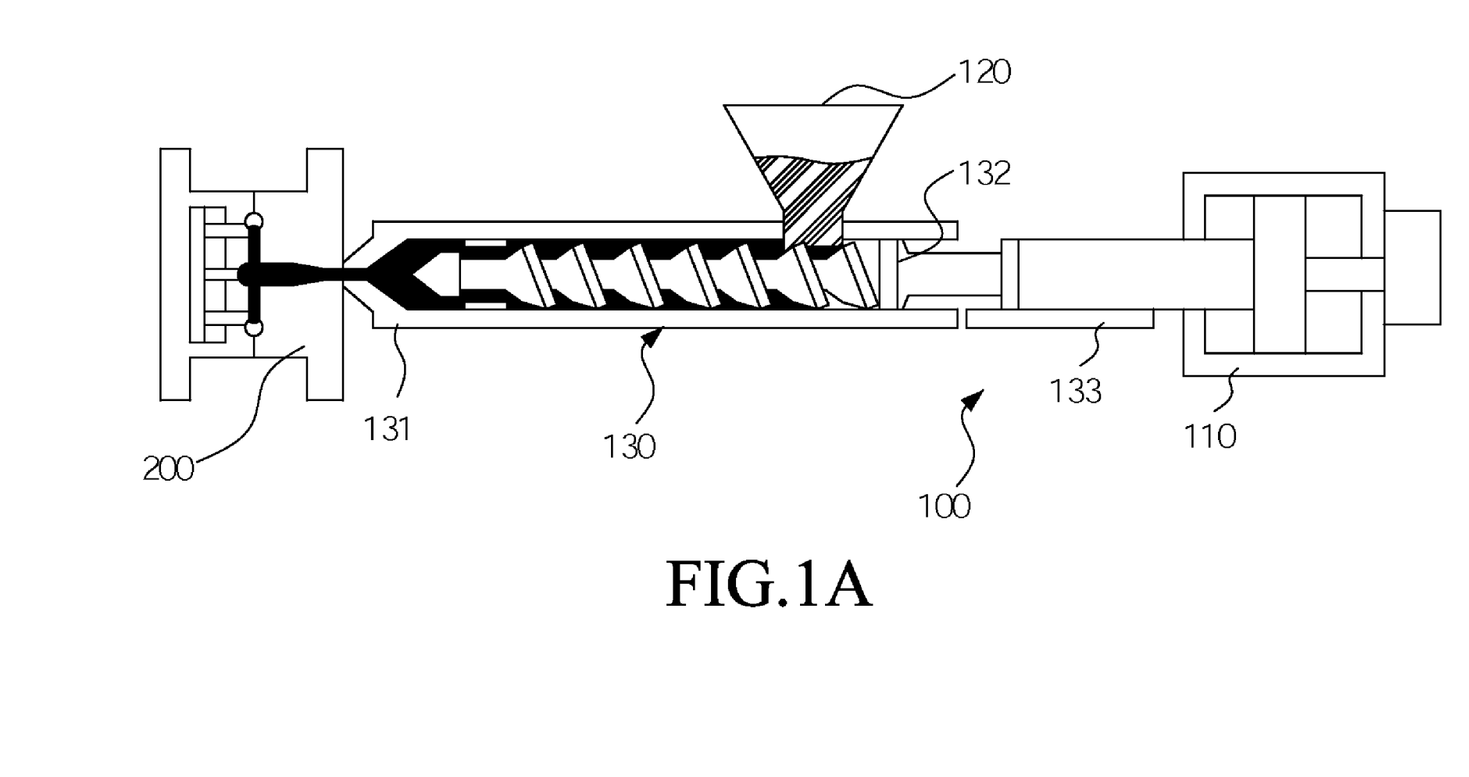
FIG. 1A is the schematic structural view of a melt-injection device.
Figure 1B:
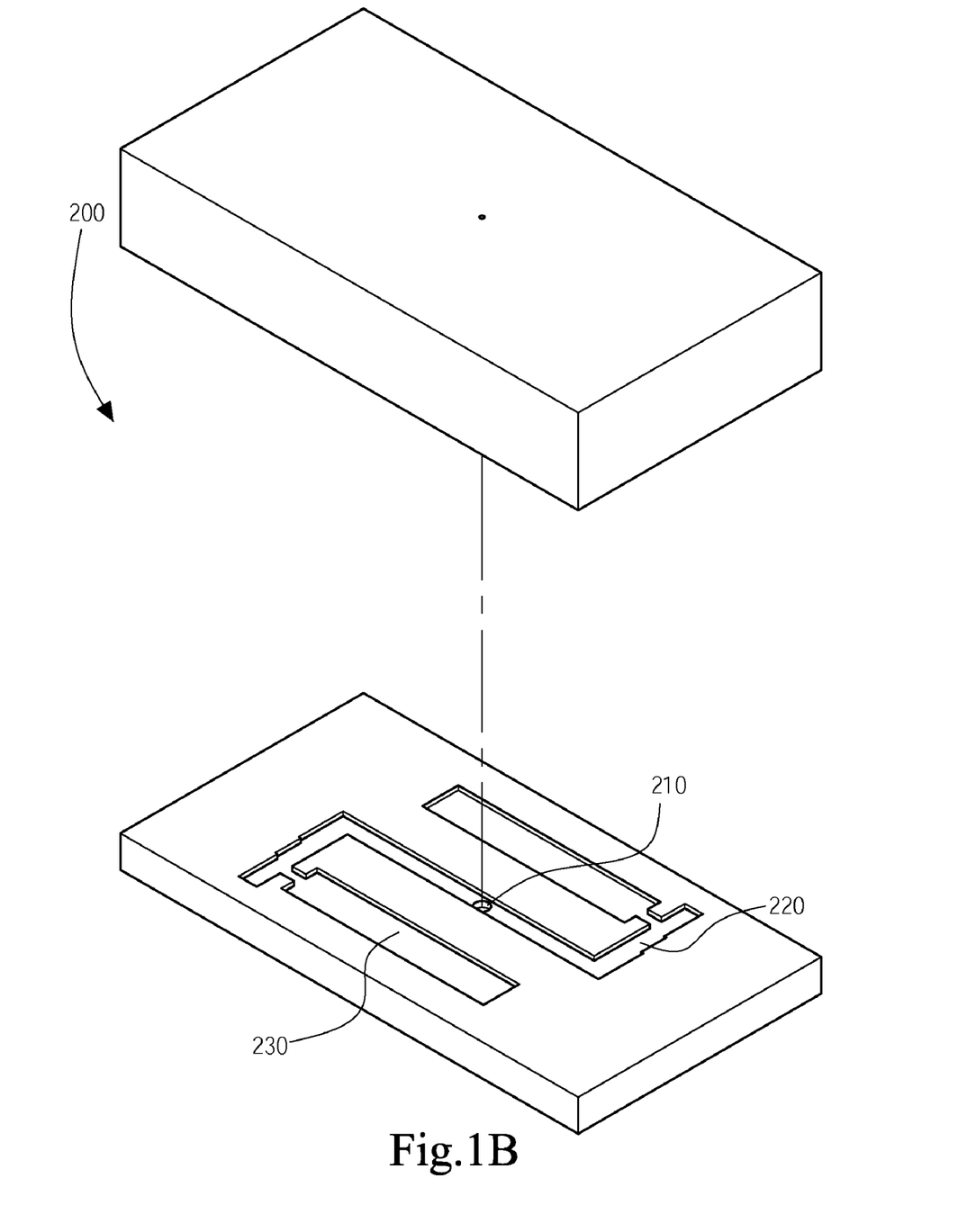
FIG. 1B is the schematic structural view of a thin-plate mold.

In the embodiment, a melt-injection device 100 shown in FIG. 1A combined with a thin-plate mold 200 displayed in FIG. 1B is used for illustration. The melt-injection device 100 includes: a pressure-applying actuator 110 for generating the injection pressure, a feed hopper 120 for feeding the plastic pellets to be melted through heat and shear force, and a group of melt-injection components 130 for melting the pellets and injecting the resultant melt. The group of melt-injection components 130 comprises an injection nozzle 131, a screw rod 132 for melting the pellets and injecting the melt, and a transducer 133 for sensing the actual position of the screw rod 132. The pressure-applying actuator 110 can be a hydraulic actuator using the hydraulic power or an electric motor using the electric power to generate the injection pressure.

A thin-plate mold 200 butting with the melt-injection device 100 includes a sprue 210, a runner 220, and a mold cavity 230. The sprue 210 is mutually butted with the injection nozzle 131. The runner 220 distributes the melt from the sprue 210 to various parts of the cavity 230. Once the melt-injection device 100 is operated, the melt is injected into the thin-plate mold 200 via the injection nozzle 131 through the sprue 210 and runner 220 and finally into the mold cavity 230. After the sprue 210, runner 220, and mold cavity 230 are all filled up with the melt, the pressure-applying actuator 110 is switched from a forward action for filling the mold with the melt into a function of supplying suitable pressure required for packing and holding the melt. When cooling down, the melt in the mold 200 shrinks. At this time, in order to maintain the melt at a suitable pressure level, the pressure-applying actuator 110 injects additional melt into the mold 200. This is called the packing and holding operation, which aims at preventing uneven shrinkage of the finished part.

Figure 2:
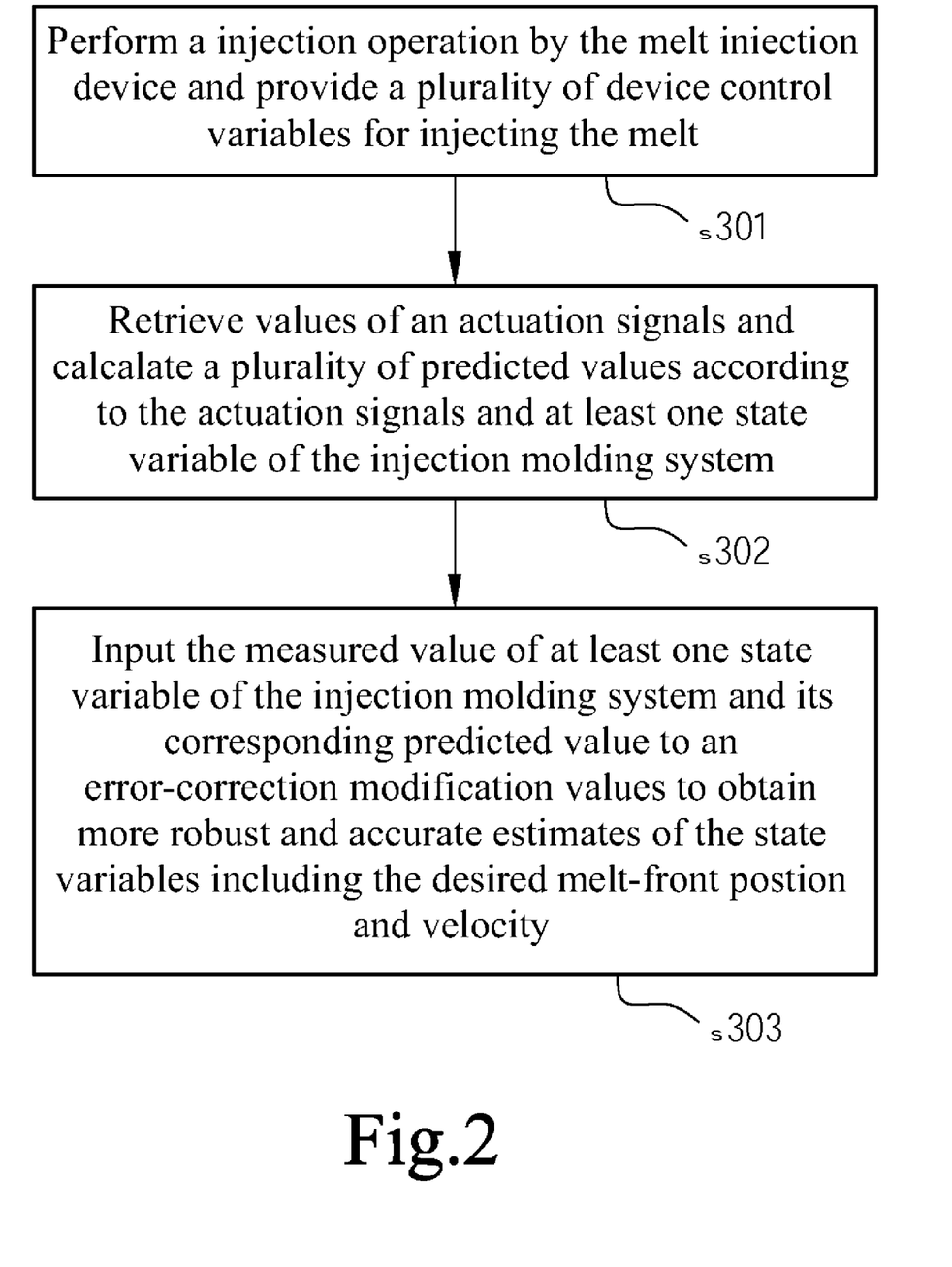
FIG. 2 is the flow chart of the melt-front sensing method of the present invention.

FIG. 2 shows a flow chart of the present invention of sensing the melt-front position and velocity. At the same time, please refer to FIG. 1A for better understanding. The sensing method is suitable for any melt-injection device 100 and consists of at least the following three steps.

As stated in the flow chart, the present invention starts with the step S301 when the melt-injection device 100 begins to perform the melt injection operation after receiving its actuation signals. For the melt-injection device 100 depicted in FIG. 1A, the actuation signal is a value of the melt injection pressure of the pressure-applying actuator 110. When the melt-injection device 100 is performing the injection operation, the state variables of the melt-injection device 100 and the injected melt are changed. The state variables can be divided into two groups. The first group contains the state variables associated with the melt-injection device 100 such as the position and velocity of the screw rod 132 and the pressure at the injection nozzle 131 while the second group comprises the state variables related to the injected melt like the flow rate, the melt-front position and velocity, and the total volume of the melt filled in the nozzle 131, sprue 210, runner 220 and cavity 230.

In the second step S302 of the invention, the information of the actuation signals and at least one state variable of the injection molding system, i.e., the combined system of the melt-injection device 100 and the injected melt, is retrieved by installing measuring apparatuses on corresponding components of the injection system. An example embodiment of the present invention may include a pressure detector installed on the pressure-applying actuator 110 for retrieving the melt injection pressure, another pressure detector installed on the injection nozzle 131 for measuring the pressure at the nozzle 131, and a transducer 133 along the screw rod 132 for measuring the position of the screw rod 132. The retrieved values of the actuation signals are then substituted into a plurality of simultaneous equations to calculate the predicted values of all state variables, including those associated with the melt-injection device 100 and the ones related to the injected melt.

The plurality of simultaneous equations is designed on the basis of the dynamics of the injection molding system incorporating with an error-correction modification term. The simultaneous equations are stored in the calculation unit. The part of the plurality of simultaneous equations related to the dynamics of the injection molding system is used in this step S302 to calculate the predicted values of all state variables. The error-correction modification term of the plurality of simultaneous equations is useful in the next step S303.

In the third step S303, the measured value of the at least one state variable of the injection molding system and its corresponding predicted value obtained in the step S302 are input to the error-correction modification term of the plurality of simultaneous equation. The resultant error-correction modification values are then used to modify the predicted values of all state variables so as to obtain the more robust and accurate estimates of all state variables including the desired melt-front position and velocity.

In the following, an embodiment of the plurality of simultaneous equations is described in order to provide a clear insight into the spirit of the present invention. The description starts with a review of the dynamic equations of the melt-injection device 100 and the injected melt, followed by an account on how the error-correction modification term is incorporated into the dynamic equations to form the plurality of simultaneous equations. At last, results of an experiment carried out on a commercial injection molding machine are presented to demonstrate the feasibility and effectiveness of the present invention.

According to FIGS. 1A and 1B, the dynamics of the shown melt-injection device 100 and the injected melt can be divided into three sub-systems, namely, the dynamics of the screw rod 132, the dynamics of the melt compressed by the screw rod 132 in the area before the injection nozzle 131, and the dynamics of the melt flowing out through the nozzle 131, sprue 210, runner 220, and finally into the mold cavity 230.

Equation (1) is the dynamic equation of the screw rod 132 derived from Newton's $2^{nd}$ Law, in which $P_1$ denotes the melt injection pressure, x the position of the screw rod 132, M the mass of the screw rod 132, $P_2$ the pressure at the injection nozzle 131, $f_s$ the friction loss, $A_1$ the cross-sectional area of the pressure-applying actuator 110, and $A_2$ the cross-sectional area of the screw rod 132.

$$\frac{d^2 x}{dt^2} = \frac{1}{M}(P_1 A_1 - P_2 A_2 - f_S). \quad (1)$$

Equation (2) is the dynamics of the melt compressed by the screw rod 132 in the area before the injection nozzle 131. It is derived from the mass conservation law of the fluid mechanics theory, in which Q represents the volumetric melt flow rate, $V_2$ the varying volume of the area between the screw rod 132 and injection nozzle 131, and $K_p$ the bulk modulus of the melt.

$$\frac{dP_2}{dt} = \frac{K_p}{V_2(x)}\left(A_2 \frac{dx}{dt} - Q\right). \quad (2)$$

Equations (3) and (4) represent the dynamics of the melt flowing out the nozzle 131 into the mold cavity 230. Equation (3) is derived from the momentum conservation law of the fluid mechanics theory, in which $x_N$ denotes the flow length of the melt at the injection nozzle 131, $x_S$ the flow length of the melt at the sprue 210, $x_R$ the flow length of the melt at the runner 220, $x_C$ the flow length of the melt at the mold cavity 230, $F_N(Q, x_N)$ the shear stress generated by the melt flowing in the injection nozzle 131, $F_S(Q, x_S)$ the shear stress generated by the melt flowing in the sprue 210, $F_R(Q, x_R)$ the shear stress generated by the melt flowing in the runner 220, $F_C(Q, x_C)$ the shear stress generated by the melt flowing in the mold cavity 230, $A_N$ the cross-sectional area of the injection nozzle 131, $A_S$ the cross-sectional area of the sprue 210, $A_R$ the cross-sectional area of the runner 220, $A_C$ the cross-sectional area of the mold cavity 230, and $\rho$ the melt density.

$$\frac{dQ}{dt} = \frac{P_2 - \left(\frac{F_N(Q, x_N)}{A_N} + \frac{F_S(Q, x_S)}{A_S} + \frac{F_R(Q, x_R)}{A_R} + \frac{F_C(Q, x_C)}{A_C}\right)}{\rho\left(\frac{x_N}{A_N} + \frac{x_S}{A_S} + \frac{x_R}{A_R} + \frac{x_C}{A_C}\right)}. \quad (3)$$

Equation (4) relates the total volume $V_P$ of the melt filled in the nozzle 131, sprue 210, runner 220, and cavity 230 to the volumetric flow rate Q defined in Equation (3). Generally, it is assumed that the melt into the nozzle 131 and beyond is an incompressible fluid during the filling stage, so the melt fill-volume $V_P$ is simply the time-integral of the volumetric flow rate Q. By the incompressibility assumption, the melt-front position can be inferred from the value of the melt fill-volume $V_P$.

$$\frac{dV_P}{dt} = Q. \quad (4)$$

For the convenience of design and conciseness of description, the dynamic equations, Equation (1) to Equation (4), of the melt-injection device 100 and the injected melt are expressed in the state-space form as follows:

$$\frac{dV}{dt} = f(V, u) \quad (5)$$
$$y = g(V)$$
$$z = h(V),$$

in which V indicates the state vector formed by the state variables, which is defined as:

$$V = \begin{bmatrix} x & \frac{dx}{dt} & P_2 & Q & V_P \end{bmatrix}^T, \quad (6)$$

The superscript T of Equation (6) indicates the transpose of a vector. The five state variables shown in Equation (6) are x: the position of the screw rod 132, dx/dt: velocity of the screw rod 132, $P_2$: pressure of the injection nozzle 131, Q: volumetric melt flow rate, and $V_P$: the melt fill-volume, as introduced in Equation (1) to Equation (4). u is taken as the vector of actuation signals of the system; in this particular embodiment, u is simply the melt injection pressure $P_1$. y denotes the vector of variable or variables that can be easily measured. In most applications, y will solely comprise the state variables associated with melt-injection device 100; for example, in the experiment to be reported later, y is made of the position of the screw rod 132 and the pressure of the injection nozzle 131. z represents another vector consisting of variable or variables that are desired but not easily measured. In most applications, z will mainly consist of the state variables related to the injected melt such as the volumetric melt flow rate Q and the melt-front positions $x_N$, $x_S$, $x_R$, and $x_C$ and the corresponding velocity of the melt flow. f(V, u) is a vector of functions which according to Equation (1) to Equation (4), can be expressed explicitly as the following.

$$f(V, u) = \begin{bmatrix} \frac{dx}{dt} \\ \frac{1}{M}(P_1 A_1 - P_2 A_2 - f_s) \\ \frac{K_P}{V_2(x)}\left(A_2 \frac{dx}{dt} - Q\right) \\ \frac{P_2 - \left(\frac{F_N(Q, x_N)}{A_N} + \frac{F_S(Q, x_S)}{A_S} + \frac{F_R(Q, x_R)}{A_R} + \frac{F_C(Q, x_C)}{A_C}\right)}{\rho\left(\frac{x_N}{A_N} + \frac{x_S}{A_S} + \frac{x_R}{A_R} + \frac{x_C}{A_C}\right)} \\ Q \end{bmatrix} \quad (7)$$

Obviously, Equation (5) retains all the information about the dynamics of the melt-injection device 100 and the injected melt as expressed in Equation (1) to Equation (4).

Then, based on the state space model, Equation (5), the plurality of simultaneous equations of the present invention is designed as follows.

$$\frac{dV'}{dt} = f(V', u) + L(y', y) \quad (8)$$

$$y' = g(V')$$

$$z' = h(V').$$

In Equation (8), the variables with superscript ' indicate the estimates of the state variables, those without' denote the values of the actuation signals and those measured by the sensors. The most important feature of Equation (8) is the inclusion of the error-correction modification term L(y', y). Excluding the error-correction modification term, the remaining Equation (8), being the same as the dynamic Equation (5) of the melt-inject device 100 and the injected melt, constitutes a simple open-loop prediction of the state variables. The serious deficiency of such open-loop prediction is that its performance is easily affected by external disturbances and changes in melt injection situation. The error-correction modification term offers a means for detecting performance deterioration due to the disturbances and changes by monitoring discrepancy between the easily measured state vector y with it estimate y' and accordingly providing suitable correction to the prediction in order to bring y' close to y. The theoretical basis behind the error-correction modification is that as long as the estimate y' can maintain in good agreement with the measured y, the estimate z' of the desired state vector will also be in good agreement with the actual, although not directly measured, state values z, consequently achieving the objective of the virtual sensing of the present invention.

From the flow chart in FIG. 2 and above discussion on the equation architecture, it should become evident that the method of sensing the melt-front position and velocity provided by the present invention is different from the melt-front soft sensing method in the prior art and the commonly used computational fluid dynamics (CFD) software, both of which are merely open-loop methods for predicting the state variables of the melt-injection device 100 and the injected melt.

Figure 3:
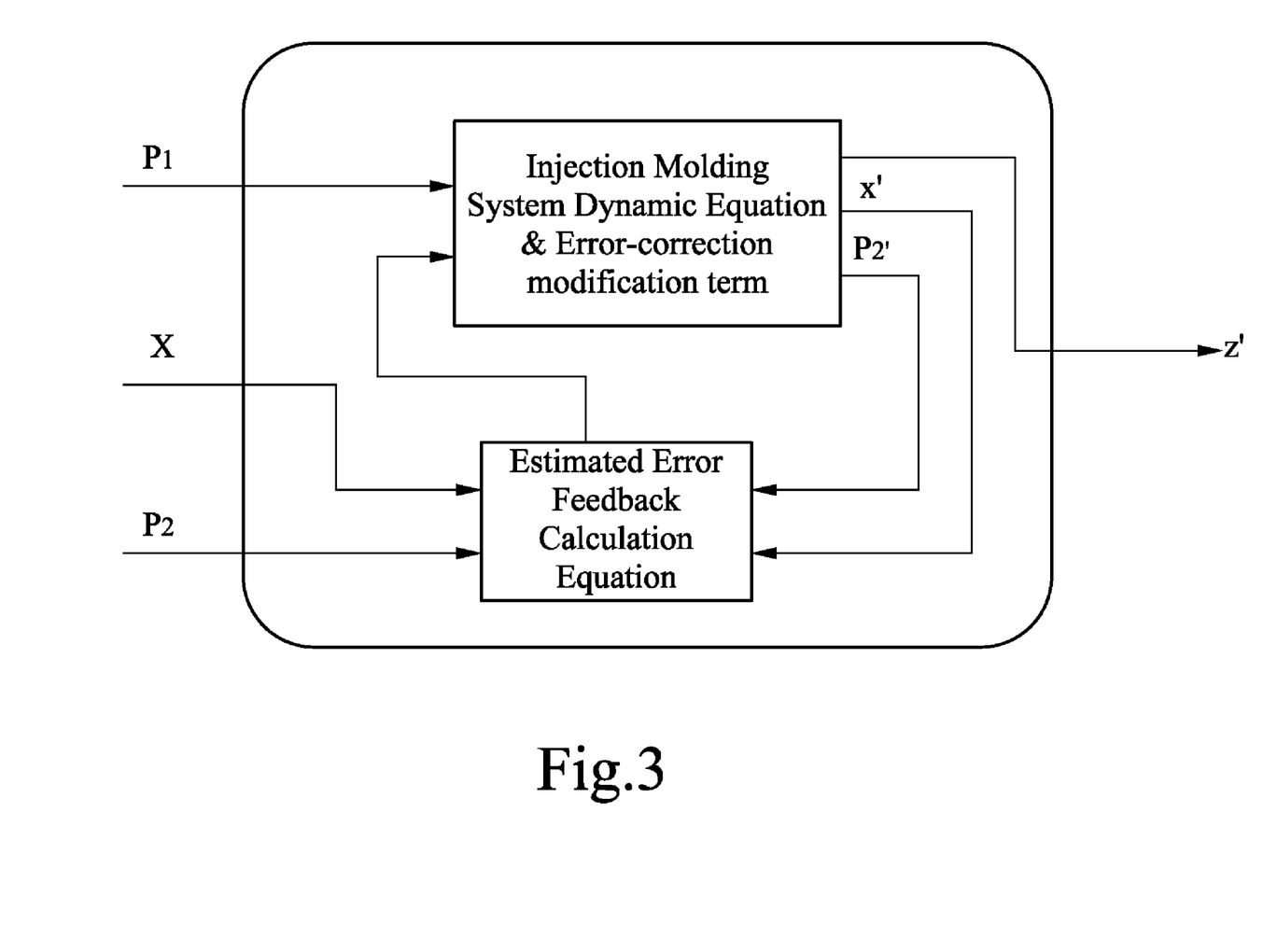
FIG. 3 provides a schematic view of the software architecture of the present invention implemented in the evaluation experiment.
Figure 4:
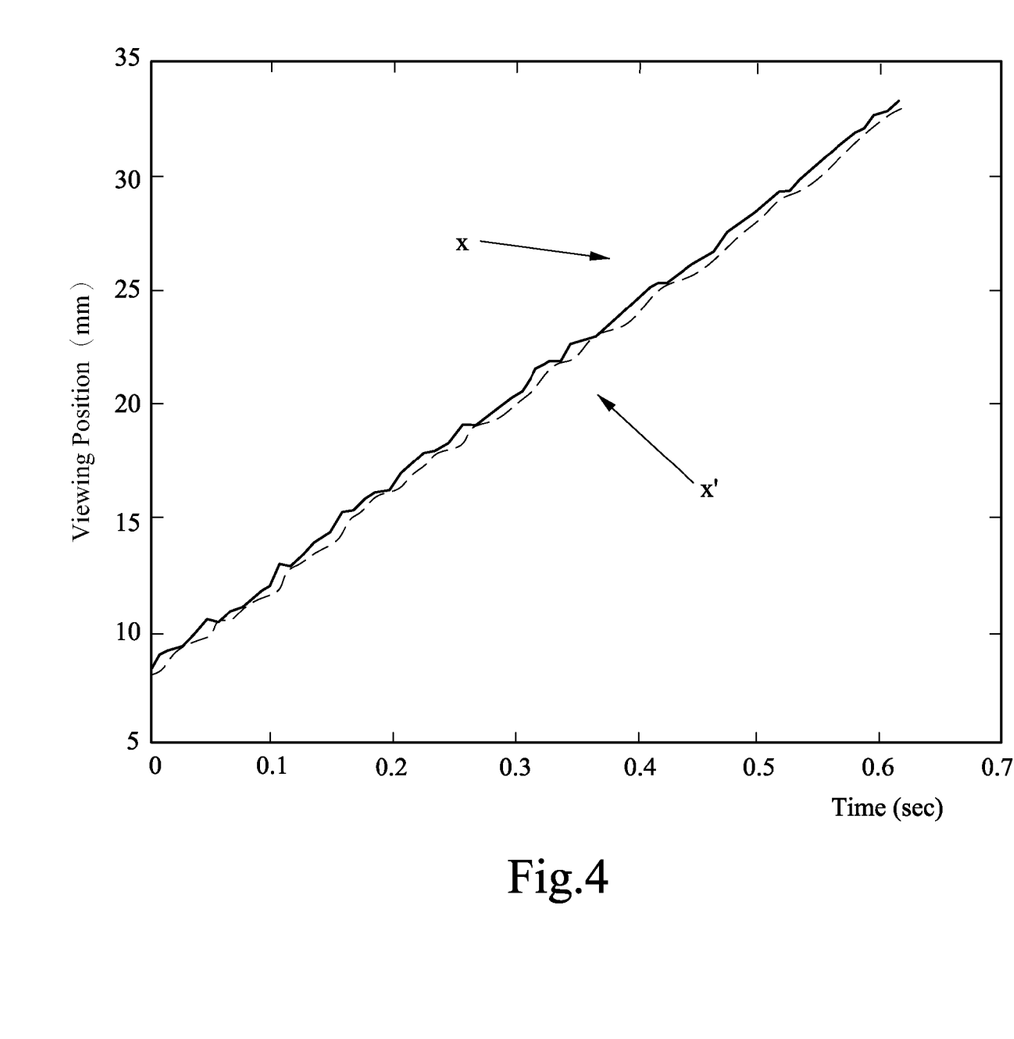
FIG. 4 shows a chart of measured position of the screw rod directly by a hardware sensor in comparison with that of the estimated position by the 'soft sensing' method of the present invention, in which the measured screw position is indicated by solid line (-) and the estimated screw position by dash line (- -)

With the understanding of the design principle of the plurality of simultaneous equations and the flow chart in FIG. 2, an experiment was carried out on a commercial injection molding machine to evaluate the feasibility and effectiveness of the present invention. FIG. 3 depicts a schematic view of the software architecture of the present invention implemented in the experiment. In this implementation, the melt injection pressure $P_1$ was retrieved as the actuation signal value while the position x of the screw rod 132 and the pressure $P_2$ at the injection nozzle 131 were the two state variables measured by hardware sensors. The actuation signal value $P_1$, the measured screw position x, and the measured nozzle pressure $P_2$ are substituted into Equation (8) to calculate the estimates of all state variables, including the estimated screw position x' and velocity dx'/dt, the estimated nozzle pressure $P_2'$, the estimated volumetric melt flow rate Q', and the estimated melt filled volume $V_p'$. Note that the measured screw rod position x and nozzle pressure $P_2$ entered Equation (8) through the error-correction modification term L(y', y).

Before presenting the experimental results, dimensions and parameters of the thin-plate mold 200, the melt-injection device 100, and the polymer melt used in the experiment are described first. For the thin-plate mold 200, each of the two thin-plate cavities 230 has 120 mm in length, 20 mm in width, and 1.2 mm in thickness; the sprue 210 has a flow length of 75 mm and a cross sectional area $A_S$ of 23.8 mm$^2$; the runner 220 has a flow length of 115 mm and a cross sectional area $A_R$ of 25.13 mm$^2$. The dimensions of the melt-injection device 100 include a cross sectional area $A_1$ of 11309.6 mm$^2$ of the pressure-applying hydraulic actuator 110, a cross sectional area $A_2$ of 804.25 mm$^2$ of the screw rod 132, a cross sectional area $A_N$ of 176.71 mm$^2$ of the injection nozzle 131, and a mass M of 140 kg of the screw rod 132. The polymer melt used in the experiment has a bulk modulus $K_p$ of 2283 Mpa and a density ρ of 0.94815 g/cm$^3$.

FIGS. 4 to 8 present results of the experiment. In order to have a reliable evaluation, 60 injection operations were performed on the melt-injection device 100 with the thin-plate mold 200. From FIG. 4, the measured screw position x and the estimated screw position x' are quite close to each other; this result indicates reliable and practical estimation of the screw position was achieved.

Figure 5:
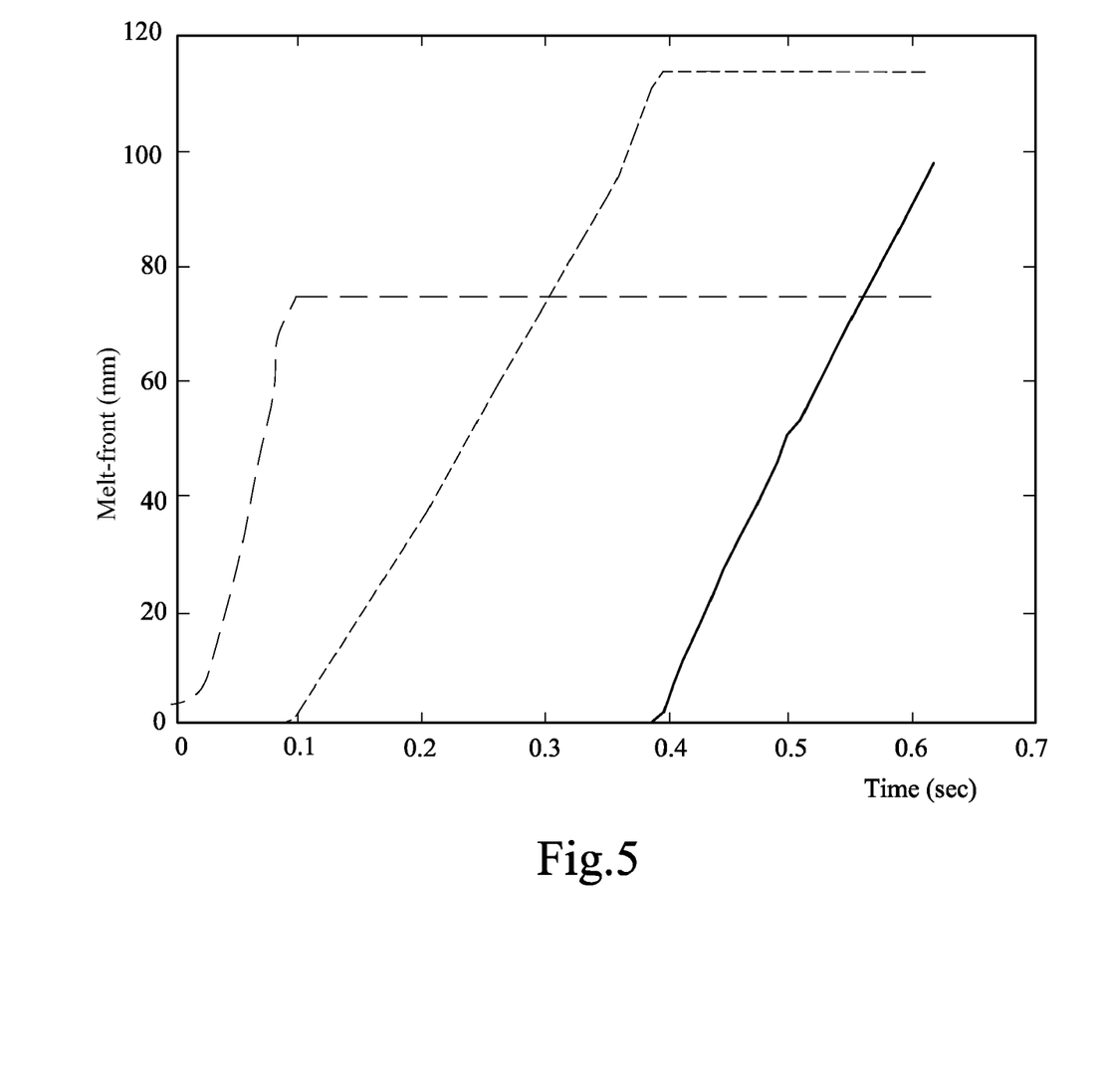
FIG. 5 is a chart of the estimated melt-front position by the 'soft sensing' method of the present invention, in which the estimated melt-front position in the sprue is indicated by long dash line (- -), the estimated flow position in the runner by short dash line (- -), and the estimated flow position in the cavity by solid line (-)
Figure 6:
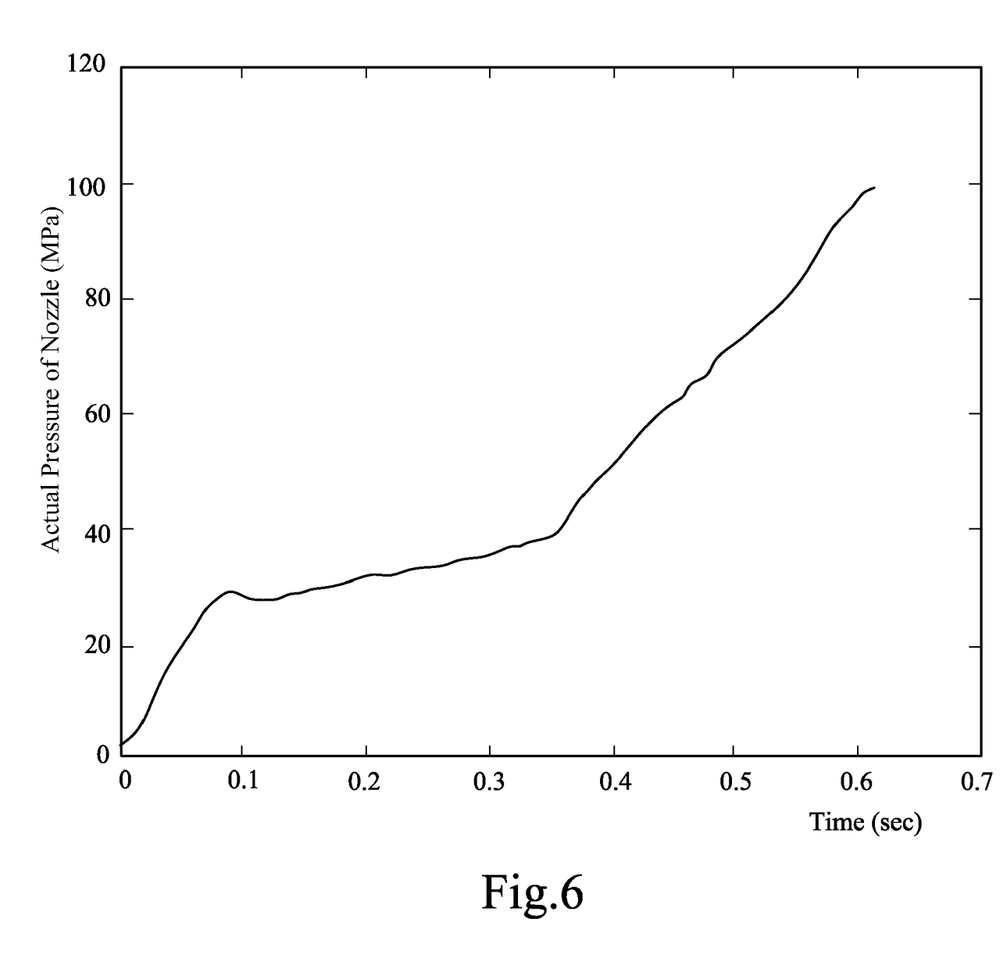
FIG. 6 is a chart of measured nozzle pressure directly by a hardware sensor.

FIG. 5 is a chart of the estimated melt-front position of the present invention, obtained in one of the 60 injection operations. It shows that in this particular injection operation, the melt-front was proceeding in the sprue in the first 0.09 seconds, then through the runner from 0.09 seconds to 0.39 seconds, and filling up the cavity from 0.39 seconds until the injection operation being switched to the packing-to-holding phase at 0.61 seconds. Since there were no sensors for the flow dynamics in the experiment, indirect references to suitable flow features in the measurement data are utilized to assess the accuracy for the estimated melt-front position. FIG. 6 shows a chart of the measured nozzle pressure of the same injection operation, portraying two significant deflections, one at 0.09 sec and the other at 0.36 sec, which could be confidently attributed to the flow transitions from the sprue 210 to runner 220 and then from the runner 220 to cavity 230, respectively. In comparison, the two flow transition times inferred from the estimated melt-front position in FIG. 5 were 0.09 seconds and 0.39 seconds. With a sampling period of 0.01 seconds of the experiment, the results of the estimated flow transition times shown in FIG. 5 advocate the effectiveness of the sensing method of the present invention.

Figure 7:
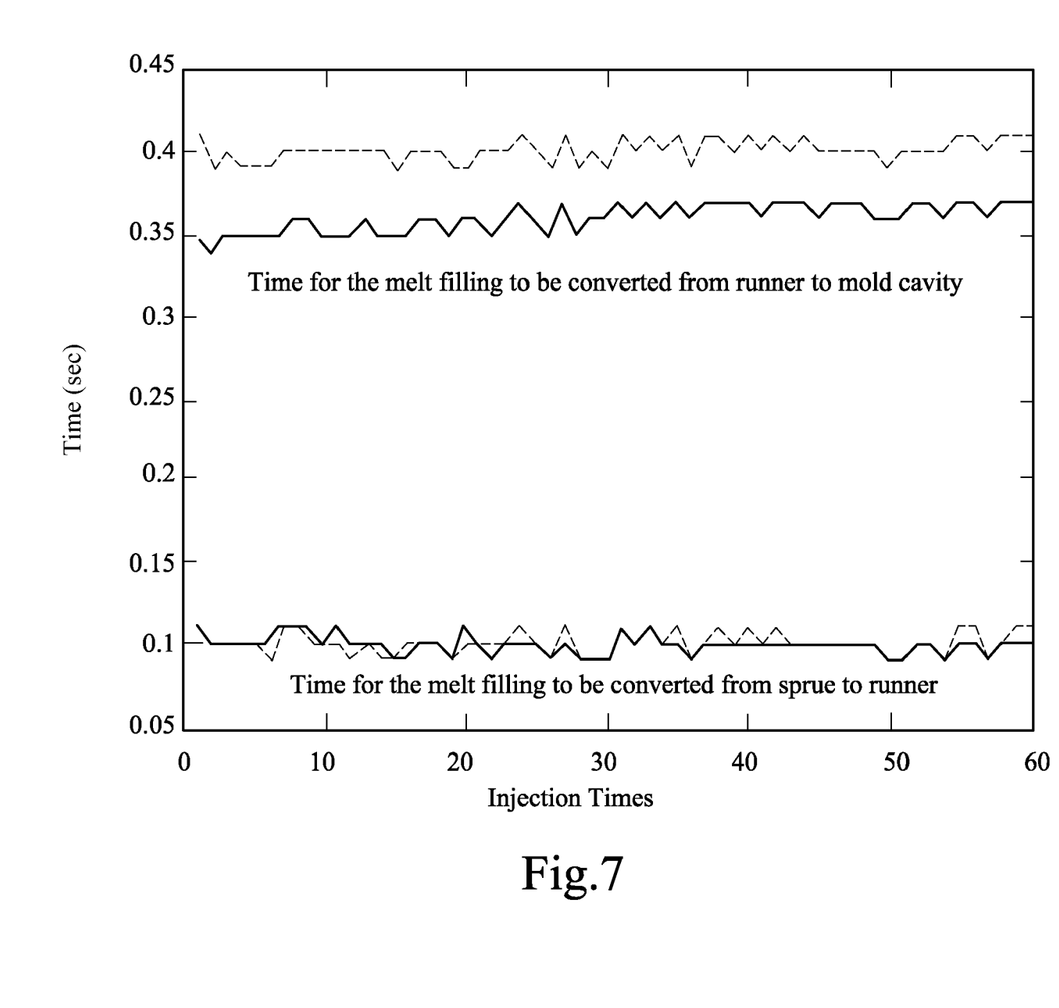
FIG. 7 is a chart of the estimated flow transition times, one from the sprue to runner and the other from runner to cavity, by the 'soft sensing' method of the present invention in comparison with the two apparent deflection times retrieved from the corresponding measured nozzle pressure, in which the two estimated transition times are indicated by dash line (- -) and the retrieved deflection times by solid line (-)
Figure 8:
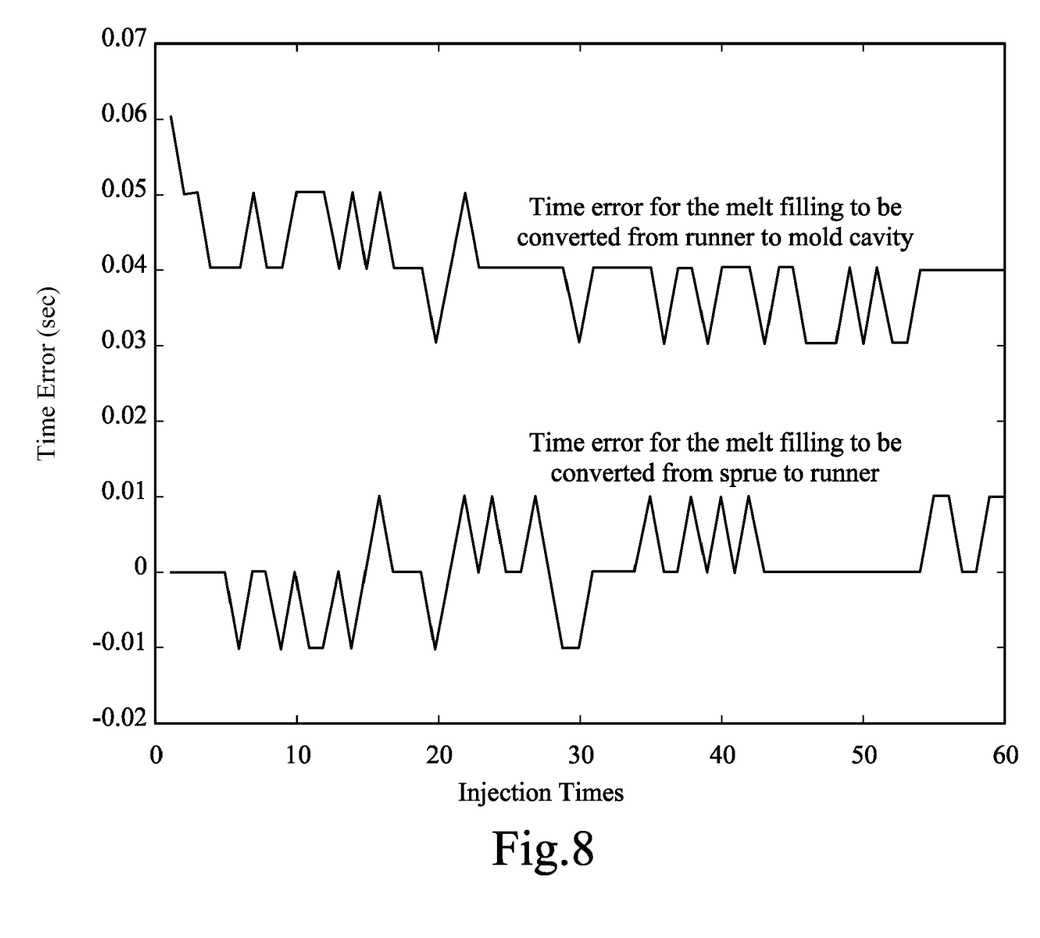
FIG. 8 is a chart of the time differences between the flow transition times directly retrieved from the measured nozzle pressure and the estimated transition times by the present invention, in which the difference between the estimated flow transition time from the sprue to runner and the first deflection time is indicated by thin solid line (-) and the difference between the transition time from the runner to cavity and the second deflection time by thick solid line (■).

FIG. 7 presents the estimated flow transition times from the sprue 210 to runner 220 and from the runner 220 to cavity 230 over the 60 injection operations. Also shown in the figure are the deflection points extracted from corresponding nozzle pressure measurements. For the convenience of assessment, FIG. 8 shows the time differences, (estimated 1$^{st}$ transition time—1$^{st}$ deflection time) and (estimated 2$^{nd}$ transition time—2$^{nd}$ deflection time). The estimated 1$^{st}$ flow transition time was generally right on the 1$^{st}$ deflection time of the nozzle pressure data. For the 2$^{nd}$ flow transition, the present invention offered estimates lagging the 2$^{nd}$ deflection times in the nozzle pressure by about 0.04 sec in the last 40 injection operations. With reference to the 0.01 sec sampling period, this assessment on the flow transition times positively validates the feasibility and effectiveness of the present invention.

With the invention being thus described, it will be obvious that the invention may be varied in many different ways. Such variations are not to be regarded as a departure from the spirit and scope of the invention, and all such modifications as would be obvious to one skilled in the art are intended to be included within the scope of the following claims.

What is claimed is:

1. A method of sensing melt-front position and velocity, applicable for a melt-injection device, comprising:
    performing a melt injection operation by the melt-injection device and providing a plurality of device control variables for injecting the melt;
    retrieving values of an actuation signals and calculating a plurality of predicted values according to the actuation signals and at least one state variable of a injection molding system; and
    simultaneously inputting the measured value of at least one state variable of the injection molding system and its corresponding predicted value to feedback calculation equation to obtain state variable error estimates and using these state variable error estimates as error-correction modification values to obtain more robust and accurate estimates of the state variables including a desired melt-front position and velocity.

2. The sensing method as claimed in claim 1, wherein the actuation signal is a value of the melt injection pressure.

3. The sensing method as claimed in claim 2, wherein the melt-injection device has a pressure-applying actuator for generating the melt injection pressure.

4. The sensing method as claimed in claim 3, wherein the pressure-applying actuator is a hydraulic cylinder or an electric pressurizer.

5. The sensing method as claimed in claim 1, wherein the melt-injection device used in the sensing method has a pressure-applying actuator for generating the melt injection pressure, a barrel for feeding the melt, and a group of melt-injection components for injecting the melt.

6. The sensing method as claimed in claim 5, wherein the melt-injection component comprises an injection nozzle, a screw/plunger for squeezing the melt, and a transducer for sensing the actual position of the screw/plunger.

7. The sensing method as claimed in claim 6, wherein the melt-injection device butts with a mold, the mold has a sprue communicated with an external part of the mold, a mold cavity, and a runner; the runner is connected between the sprue and the mold cavity, and the sprue butts with the injection nozzle, such that the melt flows into the mold cavity through the injection nozzle once the melt-injection device is operated.

8. The sensing method as claimed in claim 6, wherein the predicted state variable substituted into the error-modification equations system is a predicted position of the screw rod, and the device control variable substituted into the error-modification equation system is an actual position of the screw rod.

9. The sensing method as claimed in claim 6, wherein the predicted state variables substituted into the error-modification equation are a predicted position of the screw/plunger and a predicted pressure of the injection nozzle, and the device control input variables substituted into the error-modification equations are an measured position of the screw/plunger and an measured pressure of the injection nozzle.

10. The sensing method as claimed in claim 7, wherein the predicted state variables comprise a predicted position of the screw/plunger, a predicted pressure of the injection nozzle, a melt volumetric flow rate, a predicted flow length of the melt at the injection nozzle, a predicted flow length of the melt at the sprue, a predicted flow length of the melt at the runner, a predicted flow length of the melt at the mold cavity, and a melt fill volume, and the predicted environment variables are calculated by taking the melt injection pressure as the actuation signal.

11. The sensing method as claimed in claim 10, wherein the predicted state variables are calculated by using the melt injection pressure through a dynamic equation for an injection molding system.

12. The sensing method as claimed in claim 11, wherein the dynamic equation of the injection molding system comprises a screw rod operation equation, an injection nozzle pressure variation equation, a melt flowing equation, and a melt fill volume variation equation.

13. The sensing method as claimed in claim 6, wherein when the melt is injected from the injection nozzle, the injection nozzle generates an injection nozzle actual pressure.

* * * * *